United States Patent [19]

Yamane et al.

[11] 4,391,184
[45] Jul. 5, 1983

[54] DIAPHRAGM ACTUATOR

[76] Inventors: Ken Yamane, Yokohama, Japan; Nissan Motor Co., Ltd., 03, Yokohama, Japan

[21] Appl. No.: 192,164

[22] Filed: Sep. 30, 1980

[30] Foreign Application Priority Data

Oct. 6, 1979 [JP] Japan .................. 54-137938
Oct. 16, 1979 [JP] Japan .................. 54-132445

[51] Int. Cl.³ .......................... F16J 15/16
[52] U.S. Cl. ......................... 92/100; 92/168; 277/3; 277/27
[58] Field of Search .......... 92/94, 99, 100, 167, 92/168; 277/3, 27, 84, 88, 89, 90, 117

[56] References Cited

U.S. PATENT DOCUMENTS

| | | | |
|---|---|---|---|
| 3,531,131 | 9/1970 | Hummer | 277/84 |
| 4,251,050 | 2/1981 | McInerney | 92/168 X |
| 4,256,019 | 3/1981 | Braddick | 92/168 X |

*Primary Examiner*—Gerald A. Michalsky
*Attorney, Agent, or Firm*—James Creighton Wray

[57] ABSTRACT

A diaphragm actuator is operated by the pressure difference between a pressure chamber and a negative pressure chamber, and causes an operating shaft to slide through a wall portion of the negative pressure chamber. When the pressure in the negative pressure chamber is highly negative, ambient air leaks along a shaft seal and flows through the negative pressure chamber into a suction manifold of an engine, resulting in fluctuation of the air-fuel ratio. According to the present invention, the shaft seal includes a sealing diaphragm mounted on the wall portion, which supports a movable annular member. This annular member has a tapered surface by which an O-ring is compressed axially and radially inwardly against the operating shaft. The compression force applied to the O-ring increases as the negative pressure in the negative pressure chamber becomes higher. Another solution according to the present invention is to disconnect the negative pressure chamber from the suction manifold when a highly negative pressure at the low speed and low load operating condition of the engine is detected.

2 Claims, 7 Drawing Figures

DIAPHRAGM ACTUATOR

BACKGROUND OF THE INVENTION

The present invention relates to an improvement in a diaphragm actuator which may preferably be used in an exhaust by-pass controlling apparatus of a turbocharged internal combustion engine.

In an internal combustion engine which includes a turbocharger and a suction throttle valve upstream of the compressor of the turbocharger, suction air quantity of the engine is accurately controlled by means of a controlling apparatus including a diaphragm actuator which controls an exhaust by-pass valve to maintain the pressure difference across the compressor of the turbocharger within a predetermined value.

Such an exhaust by-pass valve controlling apparatus is shown in FIG. 1. A turbocharger 1 includes a compressor 2 which sucks air through a throttle valve 3 in a carburetor 4. An exhaust conduit which supplies the exhaust gas to a turbine 5 of the turbocharger 1 includes a by-pass passage 6 which by-passes the turbine 5. An exhaust by-pass valve 7 controls the flow rate in the by-pass passage 6 to regulate supercharged intake pressure supplied to the engine 8. The by-pass valve 7 is actuated by a diaphragm actuator 9 based on suction conduit pressure upstream of the compressor 2, which is a negative pressure, and suction conduit pressure downstream of the compressor 2, which is a negative or positive pressure.

The diaphragm actuator 9 comprises a pressure chamber 9' which communicates with the downstream side suction conduit of the compressor 2, a negative pressure chamber 10 which communicates with the upstream side suction conduit of the compressor 2, and a diaphragm 11 which defines the pressure chamber 9' and the negative pressure chamber 10. An operating shaft 12 passes through the negative pressure chamber 10 and connects the diaphragm 11 with the exhaust by-pass valve 7. A spring 13 in the negative pressure chamber 10 urges the diaphragm 11 toward the pressure chamber 9' to close the exhaust by-pass valve 7, when the pressure difference between the pressure chamber 9' and the negative pressure chamber 10 is below a predetermined value.

When the opening of the throttle 3 is small and the engine 8 is operating at a low speed range, the pressure in the upstream side suction conduit is below a predetermined value. Thus the pressure difference between the pressure chamber 9' and the negative pressure chamber 10 of the diaphragm actuator 9 urges the diaphragm 11 rightwards against the urging force of the spring 13 so that the operating shaft 12 moves rightwards to open the throttle by-pass valve 7. Consequently, exhaust gas in the exhaust manifold 14 of the engine 8 flows through the by-pass valve 7 and the by-pass passage 6 to the exhaust conduit 15 by-passing the turbine 5. By this, increase of back pressure caused by slowly rotating turbine 5 is eliminated so that the output loss is decreased.

When the engine is operated at an intermediate or high speed range, the throttle valve opening is increased so that the chamber 10 is supplied with negative pressure which is near the atmospheric pressure, and the chamber 9' is supplied with supercharging positive pressure. Thus, in the diaphragm actuator 9, the diaphragm 11 is maintained by urging force of the spring 13 in that position in which the exhaust by-pass valve 7 is closed. Exhaust gas through the exhaust manifold 14 passes through the turbine 5 to the exhaust conduit 15, and drives the turbocharger 1 to perform sufficient supercharging operation.

When the load of the engine 8 is further increased and exhaust energy supplied to the turbine 5 is increased, the supercharging pressure rises correspondingly. As the supercharging pressure is applied to the pressure chamber 9', when the supercharging pressure exceeds a predetermined value, the diaphragm 11 of the diaphragm actuator 9 is urged rightwards against the urging force of the spring 13 so that the operating shaft 12 opens the exhaust by-pass valve 7. Thus, exhaust gas energy supplied to the turbine 5 is decreased to lower the supercharging pressure. By this, an excessive supercharging is eliminated.

As shown more clearly in FIG. 2, in the above-mentioned diaphragm actuator 9, the operating shaft 12 is passed slidably through a wall portion 17 of the negative pressure chamber 10, and shaft seal means 16 prevents leakage of air from atmosphere into the negative pressure chamber 10 along the surface of the shaft 12. The shaft seal means 16 must satisfy two contrary conditions, i.e. to perfectly prevent leakage of the ambient air and to permit a smooth sliding movement of the shaft 12.

Conventionally a washer type shaft seal 16 is inserted between the wall portion 17 of the actuator 9 and a structural member 18 which is to mount the diaphragm actuator 9 in position, to provide a very small clearance between the seal means 16 and the shaft 12.

As there is a clearance between the operating shaft 12 and the shaft seal means 16, the negative pressure chamber 10 cannot be completely closed, so that the operating accuracy of the diaphragm actuator 9 is distrubed. Especially, when a very high negative pressure is applied into the negative pressure chamber 10 to actuate the diaphragm 11, leakage of ambient air through the shaft seal means 16 varies the pressure in the negative pressure chamber 10 markedly, so that the diaphragm actuator 9 is operated inaccurately.

Further, when the engine 8 is operated at a low speed and low load condition, inlet pressure of the compressor 2, i.e. the pressure in the negative pressure chamber 10, is a very high negative pressure, and the suction air quantity of the engine 8 is very small. Thus, as the ambient air leaks into the negative pressure chamber 10 through the clearance between the shaft seal means 16 and the operating shaft 12, the air which did not pass through the throttle valve 3 is additionally supplied to the engine 8. The engine 8 is normally supplied with fuel which corresponds to the air supply quantity through the throttle valve 3. Thus, the additional air which did not pass through the throttle valve 3 varies the predetermined air fuel ratio in the engine 8 so that the operation of the engine 8 becomes unstable.

SUMMARY OF THE INVENTION

Accordingly, it is an object of the present invention is to provide a diaphragm actuator which eliminates, or at least mitigates the above mentioned disadvantages.

Another object of the present invention is to provide a diaphragm actuator which positively prevents leakage of ambient air into the negative pressure chamber at the low speed operation of the engine.

Further object of the present invention is to provide a diaphragm actuator which eliminates adverse effects of the leakage.

According to one aspect of the present invention, there is provided a diaphragm actuator comprising a pressure chamber supplied with positive or negative pressure, a negative pressure chamber supplied with negative pressure, a diaphragm defining said pressure chamber and said negative pressure chamber, an operating shaft extending through a wall portion of the negative pressure chamber and connected at one end with the diaphragm, said diaphragm causing the operating shaft to axially slide, relative to said wall portion, in response to the pressure difference between the positive or negative pressure in said pressure chamber, and the negative pressure in said negative pressure chamber, wherein said wall portion is provided with a sealing arrangement which includes a sealing diaphragm mounted on said wall portion and having an axially movable inner peripheral portion surrounding the operating shaft, a movable annular member supported by the inner peripheral portion of the sealing diaphragm, a stationary annular member secured to the wall portion in the negative pressure chamber and opposing to the movable annular member, and a resilient O-ring inserted between said annular members and slidably receiving the operating shaft, at least one of the opposite surfaces of said annular members being tapered such that the O-ring is compressed by said opposite surfaces axially and radially inwardly as the negative pressure in the negative pressure chamber exceeds a predetermined value.

With the above arrangement, when the negative pressure chamber is supplied with a highly negative pressure, the sealing diaphragm urges the movable annular member against the O-ring. The O-ring is compressed axially and radially by the tapered surface so that the operating shaft is tightly sealed. Thus, leakage of air into the negative pressure chamber at a high vacuum condition is negligible. When the pressure in the negative pressure chamber is relatively high, or near the atmospheric pressure, the sealing diaphragm urges the movable member lightly, so that the O-ring is not compressed. The operating shaft smoothly moves through the O-ring, so that service life of the O-ring is long.

According to a second aspect of the present invention, there is provided a diaphragm actuator comprising a pressure chamber supplied with discharge pressure of a compressor of a turbocharged engine, a negative pressure chamber supplied with inlet pressure of the compressor, a diaphragm defining said pressure chamber and said negative pressure chamber, an operating shaft extending through a wall portion of the negative pressure chamber and connected at one end with the diaphragm, and at the other end with an exhaust by-pass valve which controls the opening of a by-pass conduit of a turbine of the engine, and a control circuit which includes means for detecting a low speed and low load operating condition of the engine, and a valve means inserted in a conduit for supplying the negative pressure chamber with the inlet pressure of the compressor, said valve means being responsive to said detecting means so as to close said conduit in the low speed and low load operating condition of the engine.

Thus, as the diaphragm actuator is isolated at the low speed and low load operating condition of the engine, no leakage problem occurs even when the shaft seal allows some leakage.

The present invention will now be described in detail hereinafter with reference to some preferred embodiments shown in the accompanying drawings.

DETAILED DESCRIPTION OF THE PREFERRED EMBODIMENTS

Figure 3:
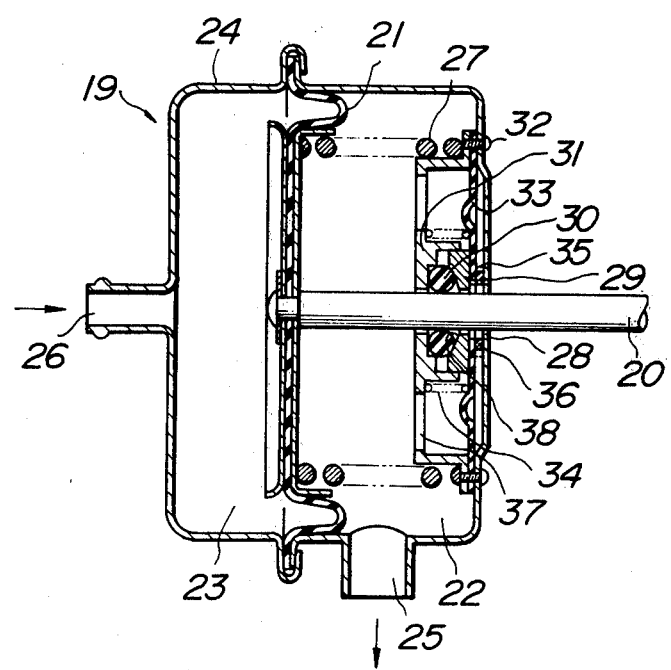
FIG. 3 is a sectional view of a diaphragm actuator according to the present invention.

FIG. 3 shows one embodiment of a diaphragm actuator 19 according to the present invention. The diaphragm actuator 19 includes a diaphragm 21 which is secured to one end of an operating shaft 20. The diaphragm 21 defines a negative pressure chamber 22 through which the operating shaft 20 passes, and a pressure chamber 23 on opposite side of the negative pressure chamber 22 in a diaphragm casing 24. The diaphragm casing 24 has a negative pressure inlet 25 which communicates the negative pressure chamber 22 with the suction conduit upstream of the compressor 2 shown in FIG. 1, and a pressure inlet 26 which communicates the pressure chamber 23 with the suction conduit downstream of the compressor 2. In the negative pressure chamber 22, a spring 27 is disposed between the casing 24 and the diaphragm 21 to urge the diaphragm 21 leftwards in FIG. 3 and to thereby maintain, through the operating shaft 20, the exhaust by-pass valve 7 (FIG. 1) closed.

The diaphragm casing 24 has a through opening 28 at the right end wall to pass the operating shaft 20. An annular movable member 29 opposes the opening 28 of the end wall, and passes the operating shaft 20. On the inner side of the movable member 29, an annular member 31 is secured to the casing 24 opposing to the movable member 29 with an O-ring 30 therebetween. The O-ring 30 is to seal the operating shaft 20.

The movable member 29 is supported by a sealing diaphragm 33 which is secured to the casing 24. The annular member 31 and the diaphragm 33 are secured with the casing 24 by means of screws 32. More particularly, the diaphragm 33 has an outer peripheral portion which is secured to the end wall of the casing 24, and an inner peripheral portion which is secured to the movable member 29.

A spring 34 is disposed between the annular member 31 and the sealing diaphragm 33. Another spring 35 is arranged between the end wall and the sealing diaphragm 33. The inner edge of the through hole 28 carries a stopper 36 which opposes to, and limit the movement of the sealing diaphragm 33. The inside surface of the diaphragm 33 is exposed to the negative pressure in the chamber 22 through a plurality of openings 37 formed in the annular member 31.

The inner side surface of the movable member 29 contacts the O-ring 30, and is formed as a tapered surface 38 having a width which is decreased radially inwardly. Thus, when the movable member 29 approaches to the annular member 31, the O-ring 30 between the members 29 and 31 is compressed by the axial force, and is urged radially inwardly by the force component which is produced by the tapered surface 38.

In operation, when the pressure difference between the negative pressure in the chamber 22 and the pressure in the chamber 23 exceeds a predetermined value determined by the urging force of the spring 27, i.e. operating range of the engine at the low speed in which the negative pressure in the chamber 22 is very high, or at the high speed high load operating range of the engine in which the pressure in the chamber 23 is very high, the diaphragm 21 moves rightwards against the urging force of the spring 27 so that the operating shaft 20 moves rightward to open the exhaust by-pass valve. When the pressure difference between the negative pressure in the chamber 22 and the pressure in the chamber 23 is below the predetermined value, as is the case in the normal operating range of the engine, the diaphragm 21 and the operating shaft are maintained in their inoperative positions by the spring 27, so that the exhaust by-pass valve closes the exhaust by-pass conduit.

When the negative pressure in the negative pressure chamber 22 is increased, the pressure difference across the sealing diaphragm 33 which supports the movable member 29 is increased accordingly, so that the diaphragm 33 moves leftwards against the urging force of the spring 34. As the movable member 29 which is supported by the diaphragm 33 approaches the annular member 31, the O-ring 30 is compressed axially and radially inwardly to tightly contact the outer peripheral surface of the operating shaft 20. Thus, the leakage of ambient air along the surface of the operating rod 20 is positively prevented.

As described, the sealing force of the O-ring 30 is produced by the urging force between the O-ring 30 and the movable member 29, and the urging force between the O-ring 30 and the operating shaft 20. This means that the sealing force is increased as the negative pressure in the chamber 22 is increased. Thus, the negative pressure chamber 22 is sealed against leakage more accurately with the force which is substantially proportional to the negative pressure in the negative pressure chamber, i.e. to the pressure difference across the O-ring 30. Thus, the leakage of air along the surface of the operating rod 20 into the negative pressure chamber 22 is substantially eliminated.

When the negative pressure in the negative pressure chamber is decreased, or substantially the same as the atmospheric pressure, the diaphragm 33 is not moved leftwards so that the O-ring 30 is not compressed by the movable member 29. Consequently, the operating shaft 20 moves through the O-ring 30 relatively freely and the O-ring 30 is prevented from wear and deformation. Thus, in the normal operating condition of the engine, the diaphragm actuator 19 accurately displaces the operating shaft 20 to open or close the exhaust by-pass valve which controls the exhaust by-pass conduit of the turbocharger.

When the engine is operated in the idling condition, a high negative pressure is applied into the negative pressure chamber 22. The diaphragm 33 and the movable member 29 compresses the O-ring 30 to achieve a sufficiently tight sealing along the operating shaft 20. Thus leakage of air along the operating shaft 20 is substantially eliminated, by which the air-fuel ratio and hence, the operation of the engine at the low speed range is stabilized.

The control circuit may be designed such that the time constant in the response characteristics of the negative pressure chamber 22 is smaller than that of the pressure chamber 23. In this instance, at the sudden deceleration from the high load operating condition, the O-ring is urged strongly against the operating shaft which is maintained in that position in which the exhaust by-pass valve is opened. Thus, the closure of the exhaust by-pass valve is delayed and the rotation of the turbocharger decreases rapidly. Consequently, surging of the compressor during the sudden deceleration can be prevented, which often occurs in the conventional control system.

In the embodiment of FIG. 3, the tapered surface 38 which compresses the O-ring 30 axially and radially inwardly is shown as being formed on the movable member 29. However, such a tapered surface may be formed on the annular member 31, or on both the movable and stationary annular members 29 and 31.

It will be appreciated that, with the sealing arrangement of the operating shaft according to the present invention, the sealing force of the O-ring is adjusted automatically corresponding to the value of the negative pressure in the negative pressure chamber 22, so that an excessive sealing force need not be applied through the whole operating range. In other words, in the normal operating range in which the operating shaft 20 need not be sealed, substantially no sealing is achieved by the O-ring. Thus, the O-ring is free from deformation and wear, and the service life of the O-ring is improved.

Conventional diaphragm actuators having an operating shaft which extends through the negative pressure chamber inevitably involves the problem of leakage when there is a substantial pressure difference across the shaft seal means, i.e. in the low speed and low load operating condition of the engine. Such a leakage inevitably affects suction air quantity into the engine. The solution shown in FIGS. 4 to 7, according to the present invention, minimizes the effect of the leakage without a special sealing arrangement.

Figure 1:
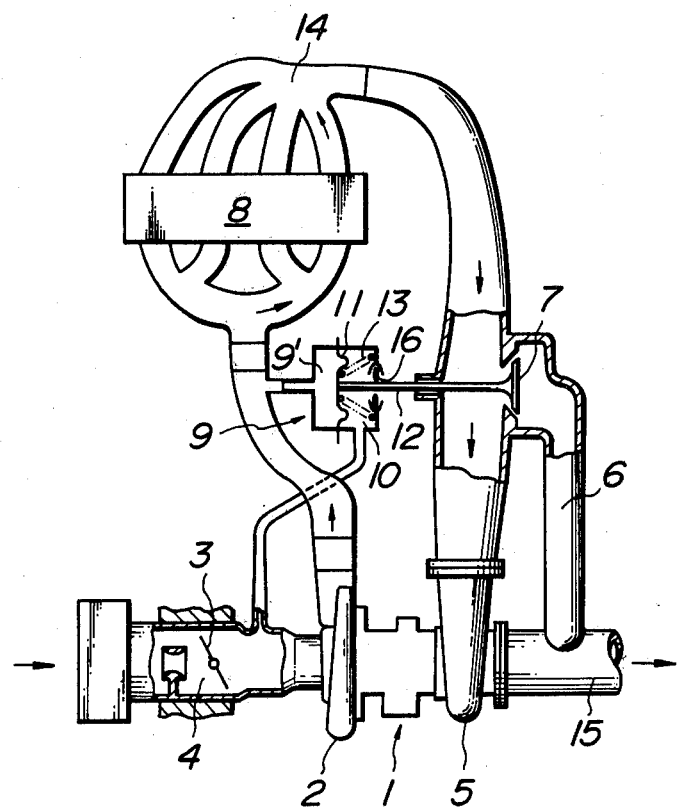
FIG. 1 is an illustration of a conventional diaphragm actuator used to control a turbocharger of an engine.
Figure 4:
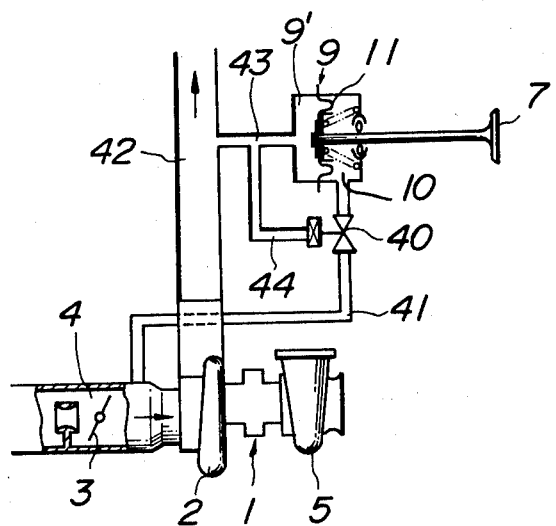
FIG. 4 is an illustration of a diaphragm actuator, according to the second aspect of the present invention, combined with the control circuit shown in FIG. 1.

In FIG. 4, reference numerals used in FIG. 1 denote corresponding components.

According to the solution of the present invention shown in FIG. 4, a shut off valve 40 is inserted in an air conduit 41 which introduces the upstream side pressure of the compressor 2 of the turbocharger 1 into the negative pressure chamber 10 of the diaphragm actuator 9. The shut off valve 40 is controlled according to the discharge pressure of the compressor 2.

When the engine is operating at the low speed and low load condition, the suction throttle valve 3 is maintained nearly fully closed, so that the air quantity supplied to the compressor 2 is low. Thus, the discharge pressure of the compressor 2 is low, even when the compressor is operating at a high speed. When the discharge pressure of the compressor 2, i.e. the pressure in the downstream side conduit 42 is decreased below a predetermined value, the shut off valve 40 is closed to shut off the conduit 41. Thus, the negative pressure chamber 10 of the diaphragm actuator 9 is disconnected from the upstream side conduit of the compressor 2.

Figure 5:
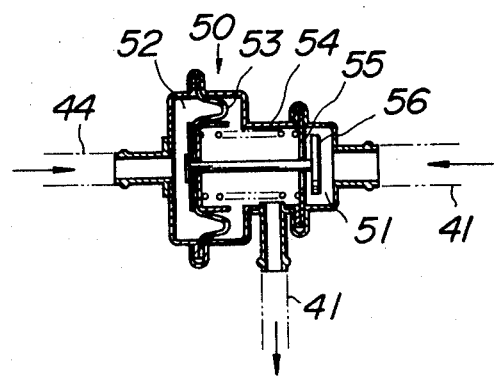
FIG. 5 is a sectional view of a shut off valve shown in FIG. 4.
Figure 6:
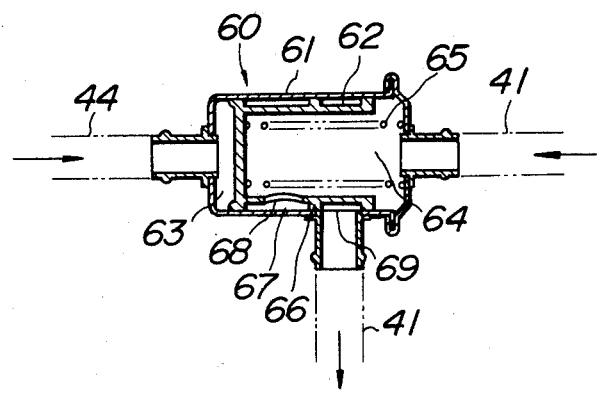
FIG. 6 is a sectional view of another embodiment of the shut off valve.

Two examples of the shut off valve 40 are shown in FIGS. 5 and 6.

As shown in FIG. 5, a shut off valve 50 inserted in the conduit 41 comprises a low pressure chamber 51 which communicates with the conduit 41, a high pressure chamber 52 which communicates with a branch conduit 44, a diaphragm 53 which defines the low and high pressure chambers 51 and 52, and a spring 54 which urges the diaphragm 53 toward the high pressure chamber 52. The conduit 44 is connected to a conduit 43 shown in FIG. 4 which communicates the downstream conduit 42 with the pressure chamber 9' of the diaphragm actuator 9.

In the low pressure chamber 51, there is provided a valve seat 55, and a valve element 56 engageable with the valve seat 55 and mounted on the right side of the diaphragm 53. When the valve element 56 engages with the valve seat 55, the conduit 41 is closed.

In operation, when the pressure in the high pressure chamber 52, i.e. the pressure in the downstream side conduit 42 exceeds a predetermined value, the diaphragm 53 is urged rightwards against the spring 54 and moves the valve element 56 from the valve seat 55 to open the communication of the conduit 41. Thus, in the normal operation of the engine, the diaphragm actuator 9 controls the exhaust by-pass valve corresponding to the pressure difference between the downstream and upstream side conduits of the compressor.

When the pressure in the high pressure chamber 52 is low, the diaphragm 53 is maintained at its inoperative position, and the valve element 56 engages with the valve seat 55 so that the conduit 41 is closed.

Another embodiment of the shut off valve shown at 60 in FIG. 6, comprises a casing 61 which communicates with the conduits 41 and 44, as in FIG. 5, a piston-type valve element 62 which slides in the casing 61 and defines in the casing a high pressure chamber 63 and a low pressure chamber 64, and a spring 65 which urges the valve element 62 leftwards to close the conduit 41. The valve 62 has a land 66 and an annular groove 67. Opening 68 formed in the side wall of the valve element communicates the groove 67 with the low pressure chamber 64.

The valve element 62 is maintained, by the urging force of the spring 65, in the closed position shown in FIG. 6, in which the land 66 covers a port 69 which communicates with the conduit 41. In the normal operating condition of the engine, the pressure difference between the high and low pressure chambers 63 and 64 is sufficiently high, so that the valve element 62 moves rightward against the spring 65. Thus, the land 66 moves beyond the port 69 which is now communicated with the groove 67 to open the conduit 41. In this condition, the diaphragm actuator controls the exhaust by-pass valve.

Figure 2:
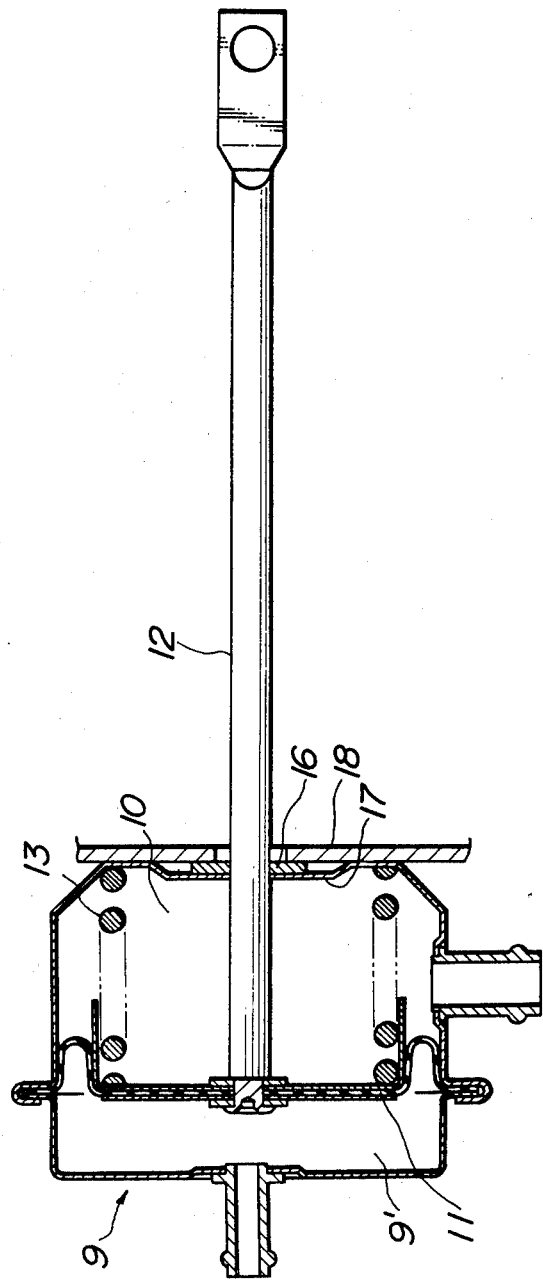
FIG. 2 is a sectional view of the conventional diaphragm actuator shown in FIG. 1.
Figure 7:
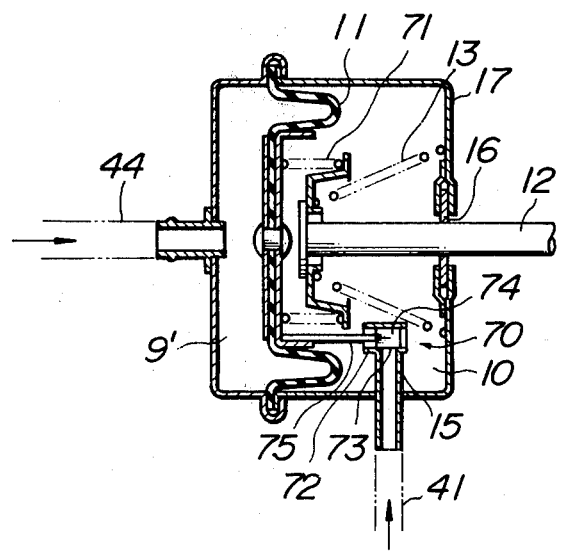
FIG. 7 is a sectional view of a diaphragm actuator combined with the shut off valve according to the present invention.

FIG. 7 shows still another embodiment of the present invention, in which a shut off valve 70 is assembled in the diaphragm actuator 9 shown in FIG. 2. Same reference numerals are used to denote corresponding components.

As shown in FIG. 7, the operating shaft 12 is indirectly mounted on the diaphragm 11, and a spring 61 is inserted between the diaphragm 11 and the operating shaft 12. The spring 61 is weaker than the spring 13 which engages with both the operating shaft 12 and the end wall 17 of the diaphragm actuator 9.

The negative pressure chamber 10 communicates with the conduit 41 through the shut off valve 70. The valve 70 comprises a cylindrical housing 72 which opens at both ends and forms a side port 73 communicating with the conduit 41. A cylindrical valve body 74 slides in the housing 72 to open or close the port 73. The valve body 74 is connected with the diaphragm 11 through a rod 75.

In the normal inoperative position, i.e. when the pressure difference between the pressure chamber 9' and the negative pressure chamber 10 is below a predetermined value decided by the weak spring 71, the diaphragm 11 is maintained at the leftward position shown in FIG. 7, by the springs 13 and 71, so that the valve body 74 closes the side port 73 of the cylindrical valve housing 72.

When the pressure in the pressure chamber 9' is sufficiently high, the diaphragm 11 moves rightwards against the spring 71 to directly contact the operating shaft 12. The valve body 74 moves in the cylindrical housing 72 and the port 73 is opened to communicate the conduit 41 with the low pressure chamber 10. Thus the diaphragm actuator 9 becomes operative to control the exhaust by-pass valve.

In the embodiments shown in FIGS. 4 to 7, the low speed and low load operation of the engine is detected by the pressure in the downstream side conduit of the compressor. However, such an operating condition can be detected based on various operating parameters of the engine, e.g. inlet or outlet pressure of the turbine, lubricating oil pressure in the engine itself or in the turbocharger, revolutional speed of the engine, or opening of the throttle valve in the suction conduit.

It will be appreciated that, at the low speed and low load operation of the engine, in which inlet pressure of the compressor is a high negative pressure and the suction air quantity of the engine is decreased, communication between the inlet side conduit of the compressor and the negative pressure chamber of the diaphragm actuator is closed. Thus, additional air which did not pass the suction throttle valve is not supplied into the engine even when the diaphragm actuator is liable to accompany the undesirable leakage. Consequently, air-fuel ratio at the low speed and low load operation is prevented from fluctuation and operation of the engine is stabilized. Further, even when the shaft seal of the diaphragm actuator is not tight, the diaphragm actuator operates only in the normal operating range so that no leakage problem is produced. Thus, the sliding resistance of the operating shaft can be minimized to attain a smooth operation of the operating shaft.

What is claimed is:

1. A diaphragm actuator comprising a pressure chamber supplied with positive or negative pressure, a negative pressure chamber supplied with negative pressure, a diaphragm defining said pressure chamber and said negative pressure chamber, an operating shaft extending through a wall portion of the negative pressure chamber and connected at one end with the diaphragm, said diaphragm causing the operating shaft to axially slide, relative to said wall portion, in response to the pressure difference between the positive or negative pressure in said pressure chamber, and the negative pressure in said negative pressure chamber, wherein said wall portion is provided with a sealing arrangement which includes a sealing diaphragm mounted on said wall portion and having an axially movable inner peripheral portion surrounding the operating shaft, a movable annular member supported by the inner peripheral portion of the sealing diaphragm, a stationary annular member secured to the wall portion in the negative pressure chamber and opposing to the movable annular member, and a resilient O-ring inserted between said annular members and slidably receiving the operating shaft, at least one of the opposite surfaces of said annular members being tapered such that the O-ring is compressed by said opposite surfaces axially and radially inwardly as the negative pressure in the negative pressure chamber exceeds a predetermined value.

2. The diaphragm actuator as claimed in claim 1, wherein the time constant in the response characteristic of the negative pressure chamber is smaller than that of the pressure chamber.

* * * * *

UNITED STATES PATENT OFFICE
CERTIFICATE OF CORRECTION

PATENT NO. : 4,391,184
DATED : July 5, 1983
INVENTOR(S) : Ken Yamane

It is certified that error appears in the above-identified patent and that said Letters Patent are hereby corrected as shown below:

On the title page add:
[73] Assignee: Nissan Motor Co., Ltd., Yokohama Japan

Signed and Sealed this

Thirtieth Day of October 1984

[SEAL]

Attest:

GERALD J. MOSSINGHOFF

Attesting Officer

Commissioner of Patents and Trademarks